(12) United States Patent
Milton et al.

(10) Patent No.: US 9,463,408 B2
(45) Date of Patent: Oct. 11, 2016

(54) COMPRESSED NATURAL GAS FILTER FOR NATURAL GAS VEHICLE

(71) Applicant: dHybrid Systems, LLC, Saint George, UT (US)

(72) Inventors: Trevor Milton, Santa Clara, UT (US); Morgan Mackelprang, Cedar City, UT (US); Ralph Hilton, Saint George, UT (US)

(73) Assignee: Dhybrid Systems, LLC, Columbus, OH (US)

( * ) Notice: Subject to any disclaimer, the term of this patent is extended or adjusted under 35 U.S.C. 154(b) by 0 days.

(21) Appl. No.: 14/271,383

(22) Filed: May 6, 2014

(65) Prior Publication Data

US 2015/0322893 A1    Nov. 12, 2015

(51) Int. Cl.
*B01D 50/00* (2006.01)
*B01D 59/50* (2006.01)
*B01D 46/42* (2006.01)
*F02M 21/02* (2006.01)
*F02M 37/22* (2006.01)
*F02M 21/06* (2006.01)

(52) U.S. Cl.
CPC ...... *B01D 46/4263* (2013.01); *F02M 21/0215* (2013.01); *F02M 21/0227* (2013.01); *F02M 21/06* (2013.01); *F02M 37/223* (2013.01)

(58) Field of Classification Search
CPC .............. F02M 21/0227; F02M 21/0215; B01D 46/4263
See application file for complete search history.

(56) References Cited

U.S. PATENT DOCUMENTS

| | | | | |
|---|---|---|---|---|
| 3,646,730 | A * | 3/1972 | Reid | B01D 46/0021 55/302 |
| 5,732,688 | A * | 3/1998 | Charlton | F02D 21/08 123/568.12 |
| 2002/0162455 | A1* | 11/2002 | Bikson | B01D 53/22 96/8 |
| 2007/0107596 | A1* | 5/2007 | Wynn | B01D 53/22 96/4 |
| 2013/0253250 | A1* | 9/2013 | Gulyansky | B01D 53/226 585/818 |

FOREIGN PATENT DOCUMENTS

| | | |
|---|---|---|
| CN | 203308607 U | 11/2013 |
| DE | 2062489 A1 | 6/1972 |
| KR | 20130065088 A | 6/2013 |

* cited by examiner

*Primary Examiner* — Amber R Orlando
(74) *Attorney, Agent, or Firm* — Tucker Ellis LLP; Carlos Garritano

(57) ABSTRACT

A filter assembly for a vehicle can be configured to be in fluid communication with a source of compressed natural gas and coolant for an engine. The filter assembly, when so arranged, filters the compressed natural gas and routes the coolant there through to warm the filter assembly.

3 Claims, 5 Drawing Sheets

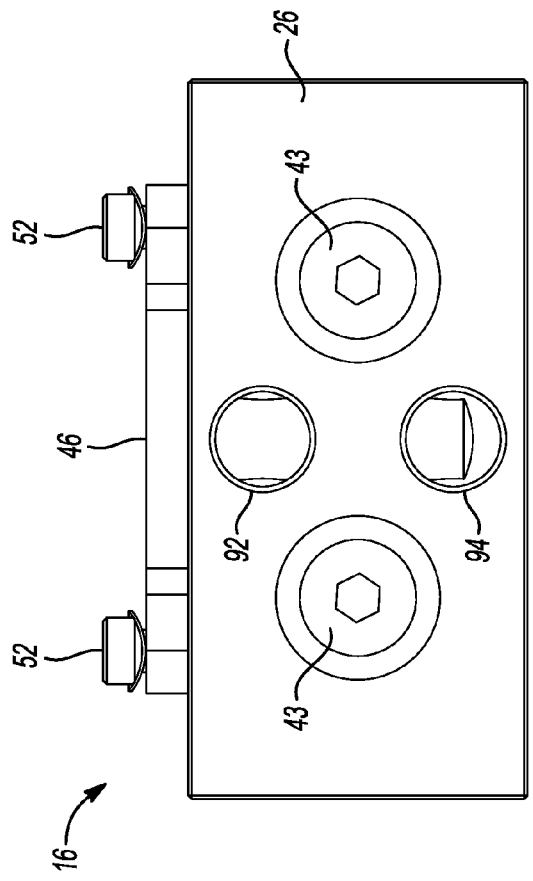
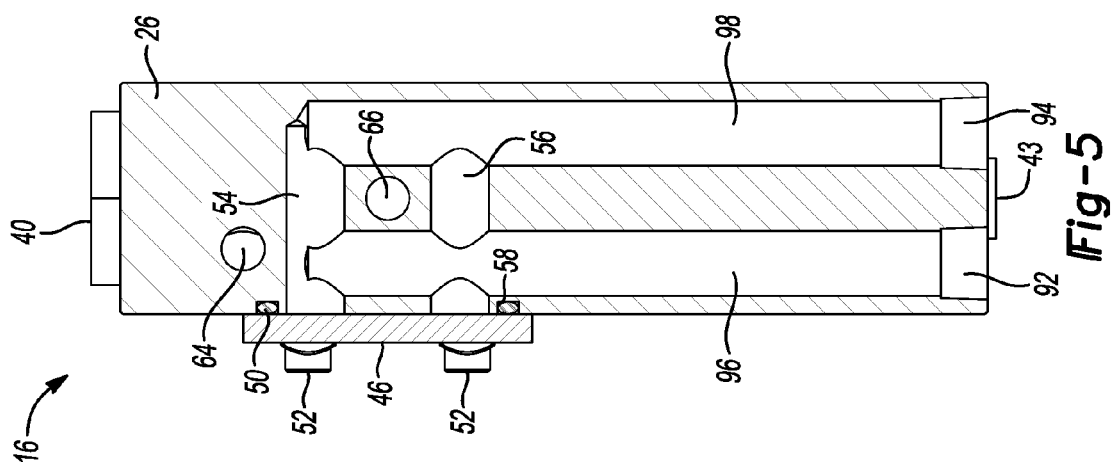

COMPRESSED NATURAL GAS FILTER FOR NATURAL GAS VEHICLE

TECHNICAL FIELD

This disclosure relates to natural gas vehicles and filters therefore.

BACKGROUND

Natural gas may be used as a fuel for certain vehicles, and is compressed and stored in on-board tanks. Such gas may contain particulate matter unsuitable for consumption by an engine. Filters, as a result, are typically included with vehicles outfitted for use with natural gas.

SUMMARY

A natural gas filter for a vehicle includes a housing defining compressed natural gas (CNG) inlet and outlet ports, and a chamber in fluid communication with the inlet and outlet ports. The filter also includes a CNG filter disposed within the chamber. The housing further defines coolant ports and one or more coolant passageways in fluid communication with the coolant ports configured to route engine coolant through the housing to hinder freezing of the CNG filter.

A natural gas filter for a vehicle includes a housing defining first and second pairs of compressed natural gas (CNG) inlet and outlet ports, and a pair of chambers disposed between the first and second pairs of CNG inlet and outlet ports. The inlet and outlet ports are each in fluid communication with the chambers. The filter also includes first and second CNG filters each disposed within one of the chambers. The housing further defines coolant ports with associated coolant passageways configured to route engine coolant through the housing to hinder freezing of the CNG filters.

A vehicle includes an engine, a source of compressed natural gas (CNG), and a filter assembly in fluid communication with the source of CNG and the engine. The filter assembly is configured to filter the CNG and route coolant from the engine there through to warm the filter assembly.

BRIEF DESCRIPTION OF THE DRAWINGS

FIG. 5 is side view, in cross-section, of the CNG filter of FIG. 1 taken along section line 5-5 of FIG. 1.

FIG. 6 is a bottom view of the CNG filter of FIG. 1.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles are subject to a wide variety of operating conditions. Certain vehicles, for example, may be exposed to temperatures exceeding 100 degrees Fahrenheit or −30 degrees Fahrenheit. Cold temperatures may be particularly problematic during vehicle start-up: below freezing temperatures may cause components associated with the fuel line or engine to freeze up. Antifreeze is included in the coolant routed through the engine to lower the temperature at which it begins to freeze.

Vehicles equipped to run on natural gas may include a natural gas filter to remove particulate matter. These filters may freeze at low temperatures to the extent water is contained within them or the filtering elements they house. Certain embodiments of natural gas filters disclosed herein may be configured to route engine coolant there through to lower the temperature at which the filters freeze and to warm the filters and compressed natural gas (CNG) passing through.

Figure 1:
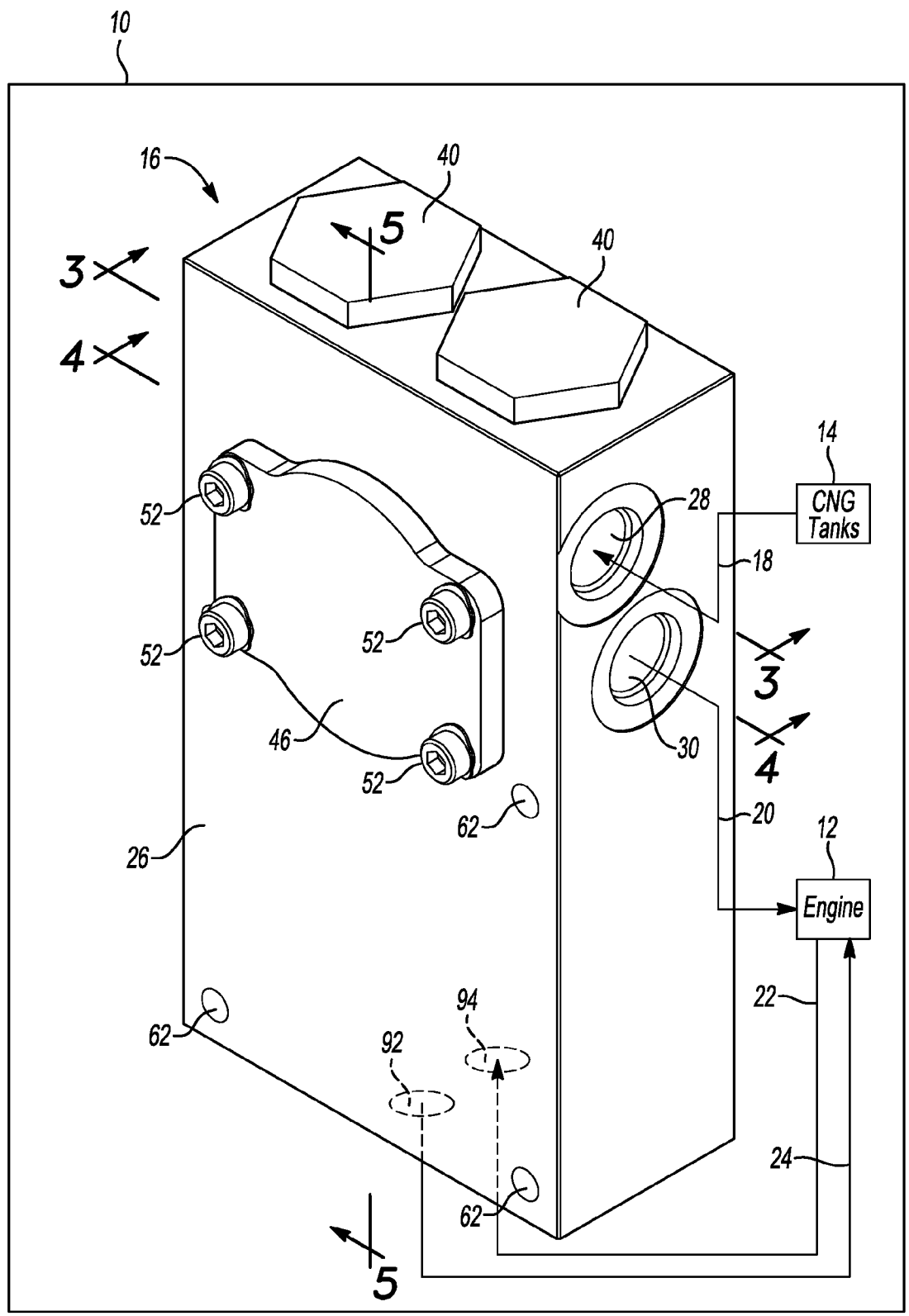
FIG. 1 is a schematic view of a natural gas vehicle including a compressed natural gas (CNG) filter (shown in perspective).

With reference to FIG. 1, a natural gas vehicle 10 includes, among other things, an engine 12, tanks 14 filled with compressed natural gas (CNG), and natural gas filter 16. Inlet and outlet natural gas lines 18, 20 fluidly connect the tanks 14 and filter 16, and the filter 16 and engine 12 respectively. That is, unfiltered CNG from the tanks 14 is provided to the filter 16 via the inlet natural gas line 18, and filtered CNG from the filter 16 is provided to the engine 12 via the outlet natural gas line 20. Inlet and outlet coolant lines 22, 24 fluidly connect the engine 12 and filter 16. That is, coolant (including antifreeze) from the engine 12 is provided to the filter 16 via the inlet coolant line 22, and coolant from the filter 16 is returned to the engine 12 via the outlet coolant line 24. As discussed in more detail below, the filter 16 is arranged to filter CNG for consumption by the engine 12 and route coolant from the engine 12 there through in an attempt to prevent the filter 16 from freezing.

Figure 2:
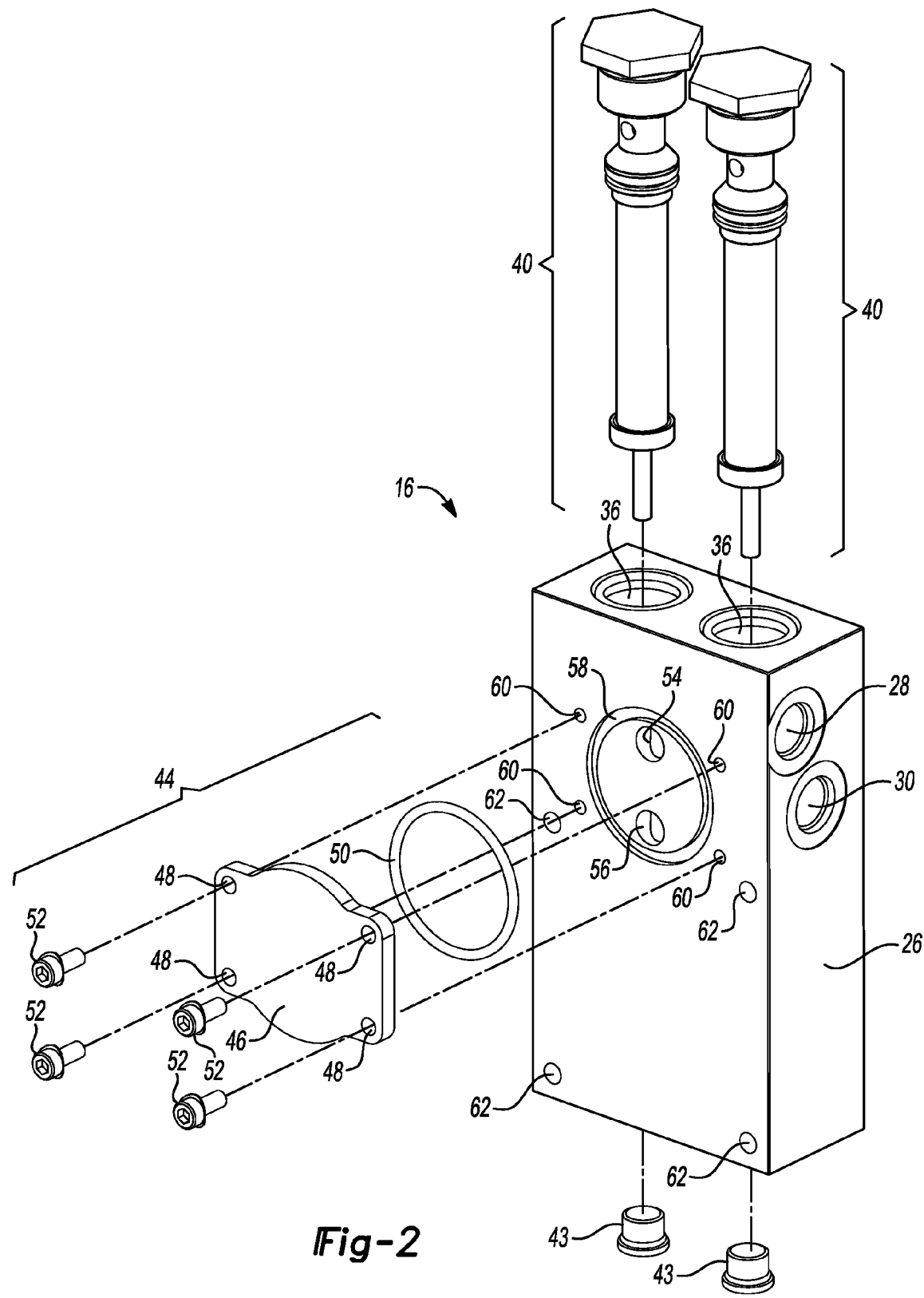
FIG. 2 is an exploded assembly view of the CNG filter of FIG. 1.

With reference to FIG. 2, the filter 16 includes a housing 26 defining inlet and outlet natural gas ports 28, 30 (and inlet and outlet natural gas ports 32, 34 shown on FIGS. 3 and 4), filter chambers 36, removable filter assemblies 40, and face plate assembly 44. The inlet port 28 is configured to receive the inlet natural gas line 18. The outlet port 30 is configured to receive the outlet natural gas line 20. (The inlet and outlet ports 32, 34 are also configured to receive inlet and outlet natural gas lines. In this example however, such inlet and outlet natural gas lines are not so connected.) Each of the removable filter assemblies 40 is disposable within one of the chambers 36. Threaded filter caps 43 are inserted into the housing 26 to seal a bottom of the filter chambers 36.

The face plate assembly 44 includes an access plate 46 defining mounting bores 48, O-ring 50, and screw assemblies 52. And, the housing 26 further defines access ports 54, 56, O-channel 58, threaded mounts 60, and mounting bores 62. The access ports 54, 56 (as the name suggests) provide access to coolant channels (discussed in greater detail below) routed through the housing 26. The access ports 54, 56 are covered by the access plate 46. The access plate 46 is attached to the housing 26 via the screw assemblies 52, which pass through the mounting bores 48 and engage the threaded mounts 60. The O-ring 50 is disposed within the O-channel 58 and compressed between the housing 26 and face plate 46 to seal the access ports 54, 56. The filter 16 can be mounted to a support, such as a CNG tank structure, etc., via the mounting bores 62.

Figure 3:
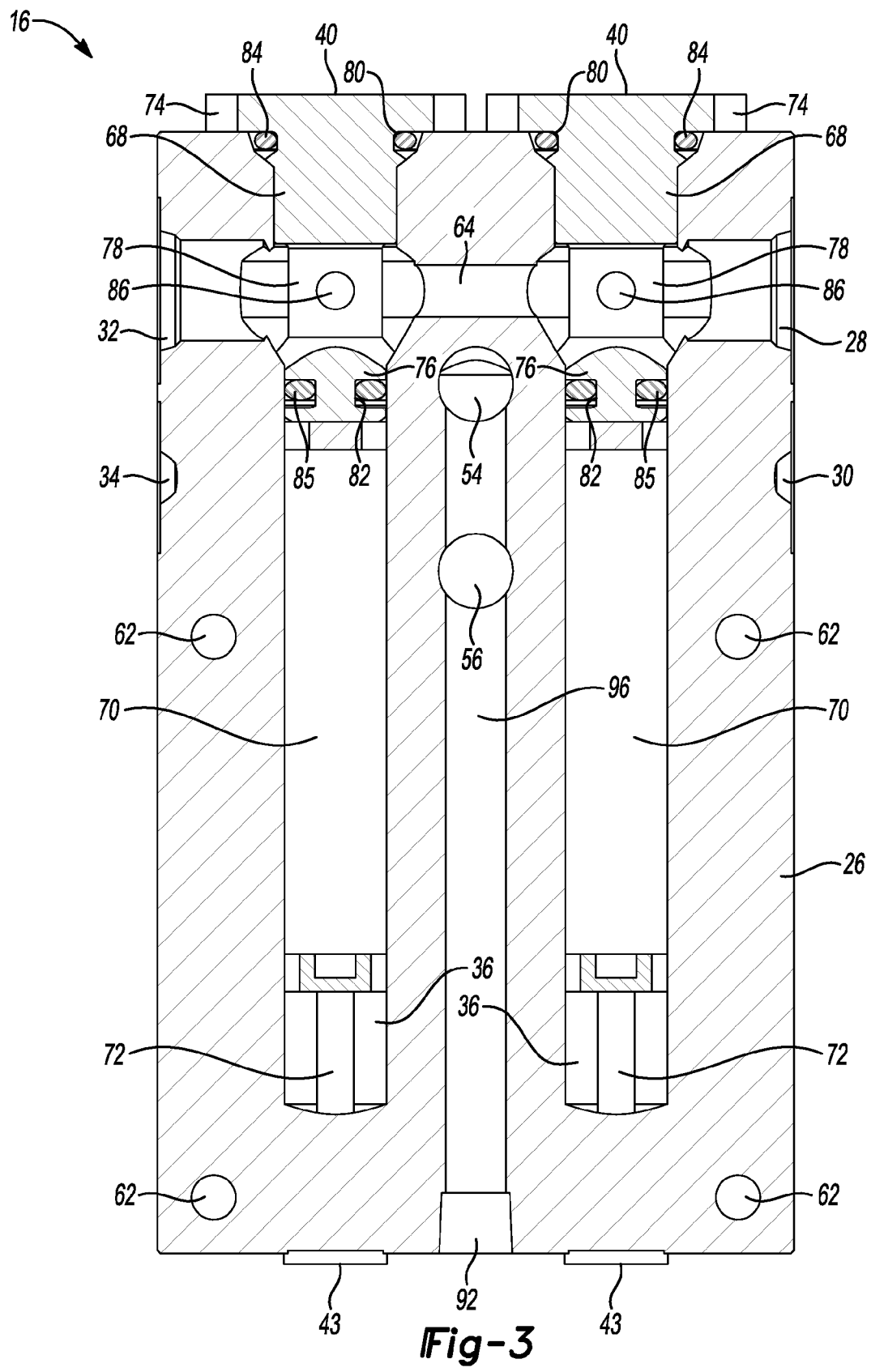
FIG. 3 is a front view, in cross-section, of the CNG filter of FIG. 1 taken along section line 3-3 of FIG. 1.
Figure 4:
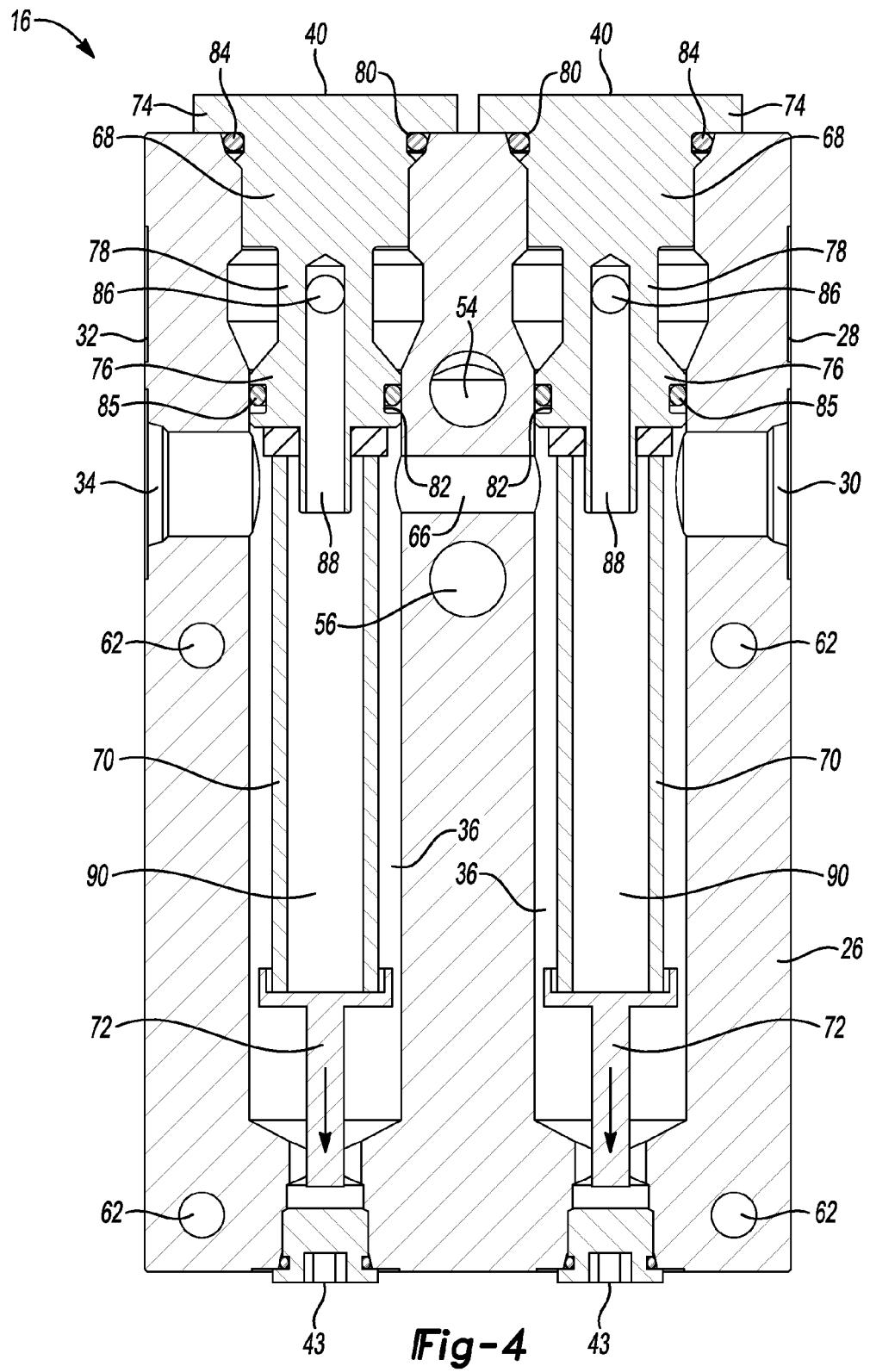
FIG. 4 is a front view, in cross-section, of the CNG filter of FIG. 1 taken along section line 4-4 of FIG. 1.

With reference to FIGS. 3 and 4, the housing 26 further defines gas passageway 64 (FIG. 3), which is disposed between and fluidly connects the inlet ports 28, 32, and gas passageway 66 (FIG. 4), which is disposed between and fluidly connects the outlet ports 30, 34. As such, two natural gas inlet lines and two natural gas outlet lines may be connected with the filter 16 even though the example of FIG. 1 illustrates only the single gas inlet line 18 and single gas outlet line 20.

The filter assemblies 40 each include a head portion 68, body 70, and plunger 72. Each of the head portions 68 defines a cap 74 configured to engage an upper portion of one of the chambers 36 and rest on an exterior surface of the housing 26, a base 76 configured to mate with the body 70, and a neck 78 extending between the cap 74 and base 76. Each of the caps 74 is further provided with a circumferential groove 80. Likewise, each of the bases 76 is provided with a circumferential groove 82. O-rings 84, 85 ride within the grooves 80, 82 respectively and are compressed between the respective head portions 68 and housing 26 to seal the filter assemblies 40 within the filter 16.

Each of the necks 78 defines an entry port 86 disposed between the corresponding O-rings 84, 85 and a throat 88 fluidly connecting the entry port 86 and the corresponding body 70. The entry ports 86 are positioned within the housing 26 so as to be in fluid communication with the gas passageway 64 such that gas entering from either of the inlet ports 28, 32 can enter both of the entry ports 86.

Each of the bodies 70 defines a reservoir 90 (FIG. 4) within which natural gas filtering elements (not shown) may be held. Each of the plungers 72 is spring loaded and carried by one of the filter caps 43, and as illustrated, is engaged with an end of one of the bodies 70 opposite the corresponding base 76. CNG entering from either or both of the inlet ports 28, 32 passes through the entry ports 86 and throats 88 into the reservoirs 90 for filtering. The pressure associated with the CNG within the reservoirs 90 causes the plungers 72 to move away from their corresponding bodies 70, which allows the now filtered CNG to escape into lower portions of the chambers 36. These lower portions are arranged within the housing 26 to fluidly communicate with gas the passageway 66 and outlet ports 30, 34. The O-rings 85 prevent the filtered CNG from mixing with the unfiltered CNG.

With reference to FIGS. 3 and 5, the housing further defines coolant ports 92, 94 and associated coolant passageways 96, 98 routed along and between the filter assemblies 40. The coolant port 92 is configured to receive the outlet coolant line 24. And, the coolant port 94 is configured to receive the inlet coolant line 22 (although this arrangement may be reversed). The fluid passageways 96, 98 fluidly connect with the access port 54, 56 such that coolant entering the coolant port 94 may travel along the coolant passageway 98, across each of the access ports 54, 56, and along the coolant passageway 96 to the coolant port 92 (and vice versa depending on the direction of coolant flow from the engine 12). Routing coolant from the engine 12 through the housing 26 may lower the freezing temperature of the filter assemblies 40 and also transfer waste heat from the engine 12 to the CNG passing there through.

With reference to FIGS. 4, 5 and 6, the filter assemblies 40, which are aligned with the filter caps 43, and the coolant passageways 96, 98, which are aligned with the coolant ports 92, 94 respectively, are adjacent to one another. This arrangement may facilitate heat transfer between the coolant passing through the coolant passageways 96, 98 and the CNG passing through the filter assemblies 40.

While an example embodiment is described above in detail, it is not intended that this embodiment describe all possible forms encompassed by the claims. As an example, multiple filter assemblies (or gas inlet and outlet ports) need not be included, and passageways configured to direct coolant (or other fluid) there through need not be routed between two filter assemblies. A filter may have only a single filter assembly of any suitable type, and coolant passageways may be routed exclusively through one end of the filter. Certain filters, as another example, may have several coolant inlet ports with associated coolant passageways that merge into a single coolant outlet port (or vice versa), or have multiple coolant inlet ports and outlet ports depending on desired rates of net coolant flow. In still other examples, coolant ports may be located on different faces of the filter (to the extent the filter has faces) such that coolant enters and exits from different sides of the filter. Other arrangements are also contemplated.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A natural gas filter for a vehicle comprising:
    a housing defining first and second pairs of compressed natural gas (CNG) inlet and outlet ports, and a pair of side-by-side spaced apart chambers disposed between the first and second pairs of CNG inlet and outlet ports, wherein the inlet and outlet ports are each in fluid communication with the pair of side-by-side spaced apart chambers; and
    first and second CNG filters each disposed within one of the pair of side-by-side spaced apart chambers, wherein the housing further defines coolant ports with associated coolant passageways configured to route engine coolant between and along a length of, but not around, the pair of side-by-side spaced apart chambers to hinder freezing of the CNG filters.

2. The filter of claim 1, wherein the coolant ports are disposed on a same face of the housing.

3. The filter of claim 1, wherein the first and second pairs of CNG inlet and outlet ports are disposed on opposite faces of the housing.

\* \* \* \* \*